United States Patent [19]

Hargreaves et al.

[11] 3,741,442

[45] June 26, 1973

[54] APPARATUS FOR MIXING AND DISPENSING DIFFERENT PARTICULATES MATERIALS IN ACCURATELY CONTROLLABLE PROPORTIONS

[75] Inventors: Derek Burtt Hargreaves, Adlington; Eric Staniforth, Macclesfield, both of England

[73] Assignee: National Research Development Corporation, Macclesfield, England

[22] Filed: June 16, 1971

[21] Appl. No.: 153,683

[30] Foreign Application Priority Data

June 17, 1970 Great Britain................29302/70

[52] U.S. Cl.................. 222/142, 222/145, 222/317
[51] Int. Cl............................................ B67d 5/52
[58] Field of Search................... 222/132, 142, 145, 222/281, 317, 310, 311

[56] References Cited
UNITED STATES PATENTS

| | | | |
|---|---|---|---|
| 3,606,965 | 9/1971 | Cortelyou et al. | 222/317 X |
| 416,204 | 12/1889 | Winchell | 222/317 X |
| 932,062 | 8/1909 | Schmid | 222/317 |
| 1,814,483 | 7/1931 | Morgan | 222/132 |
| 2,919,466 | 1/1960 | Roemer | 222/281 X |

Primary Examiner—Allen N. Knowles
Assistant Examiner—John J. Love
Attorney—Alan H. Levine

[57] ABSTRACT

There is disclosed apparatus for mixing and dispensing at least two different particulate materials in accurately controllable proportions comprising at least two containers, metering means associated with each container adapted continuously to receive particulate material from its container, drive means for said metering means, means for adjusting the metering capacity of at least one of said metering means, and means for dispensing together all the particulate material issuing from said metering means to a desired location. The metering means preferably consists of a pair of rollers disposed to form a nip through which material reaching the upper side thereof is dispensed at a rate depending upon the speeds and directions of rotation of the rollers, their surface characteristics and their relative dispositions and sizes, and comprising means for adjusting the length of nip exposed to material in the associated container and thereby the metering capacity of the rollers. The means for adjusting the length of the nip may conveniently comprise a vertical shutter lying at right angles to the roller axes and in close-fitting relationship with the walls of the container and the rollers and means for adjusting the position of the shutter longitudinally of the rollers. In the preferred embodiment disclosed there are three containers each with metering means consisting of roller pairs, two being provided with means for adjusting the length of nip exposed.

3 Claims, 4 Drawing Figures

APPARATUS FOR MIXING AND DISPENSING DIFFERENT PARTICULATES MATERIALS IN ACCURATELY CONTROLLABLE PROPORTIONS

This invention relates to the feeding of materials and in particular to apparatus for mixing and dispensing at least two different particulate materials in accurately controlled proportions comprising at least two containers, metering means associated with each said container adapted continuously to receive particulate material from its container, drive means for said metering means, means for altering the rate at which particulate material is dispensed by at least one of said metering means, and means for dispensing together all the particulate material issuing from said metering means to a desired location. Such an apparatus is described in U.S. Pat. application Ser. No. 855,843, filed Sept. 8, 1969, and will be termed herein an apparatus of the type described.

According to the invention apparatus of the type described comprises means for adjusting the metering capacity of at least one of said metering means.

By "particulate material" is meant material in forms such as seeds, granules, fragments and short lengths.

For example in the case where the metering means comprises a pair of rollers disposed to form a nip through which material reaching the upper side thereof is dispensed at a rate depending upon the speeds and directions of rotation of the rollers, their surface characteristics and their relative dispositions and sizes, the metering capacity of the rollers can be adjusted by changing the length of the nip exposed to the material. In one such arrangement there is an adjustable shutter longitudinally movable with respect to the rollers to adjust the length of nip exposed to material in the associated container.

The invention may be performed in various ways and one specific embodiment will now be described by way of example with reference to the accompanying drawings in which.

Figure 1:
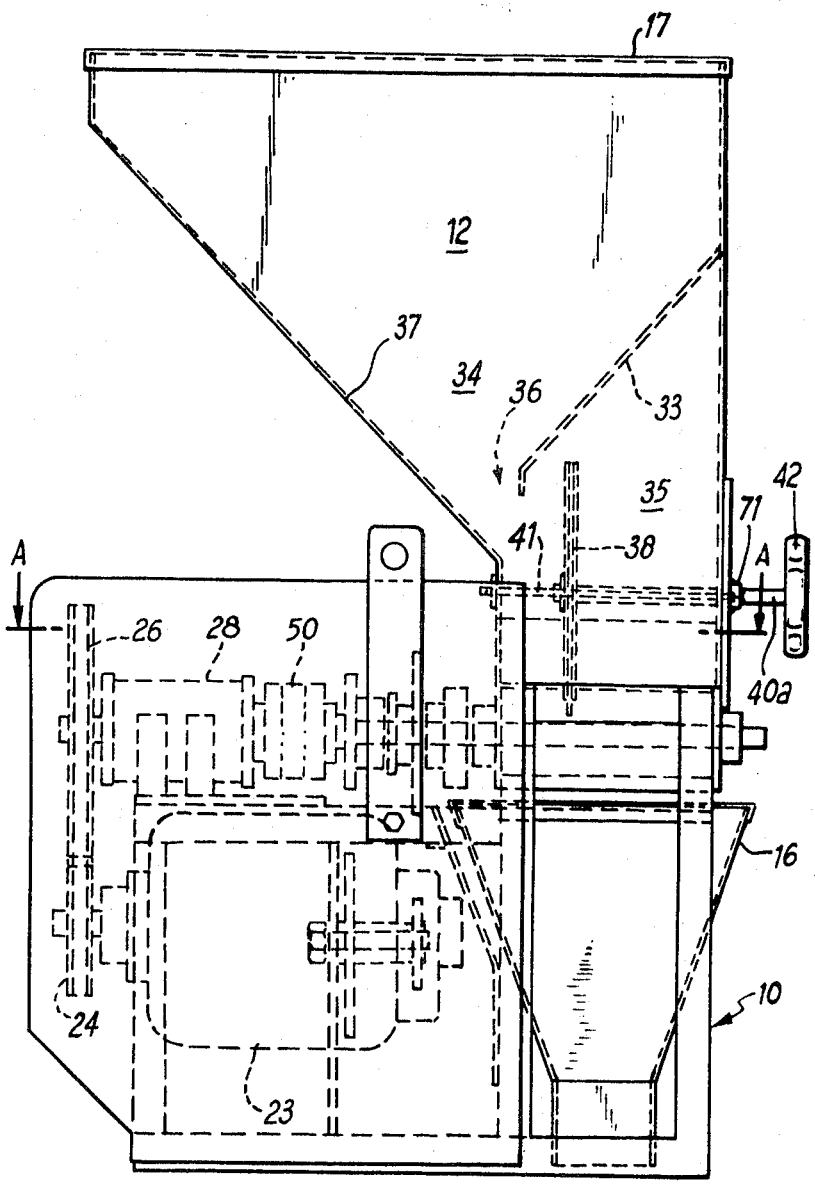
FIG. 1 is a side elevation of an apparatus for mixing together and dispensing at least two different particulate materials in accurately controlled proportions.
Figure 2:
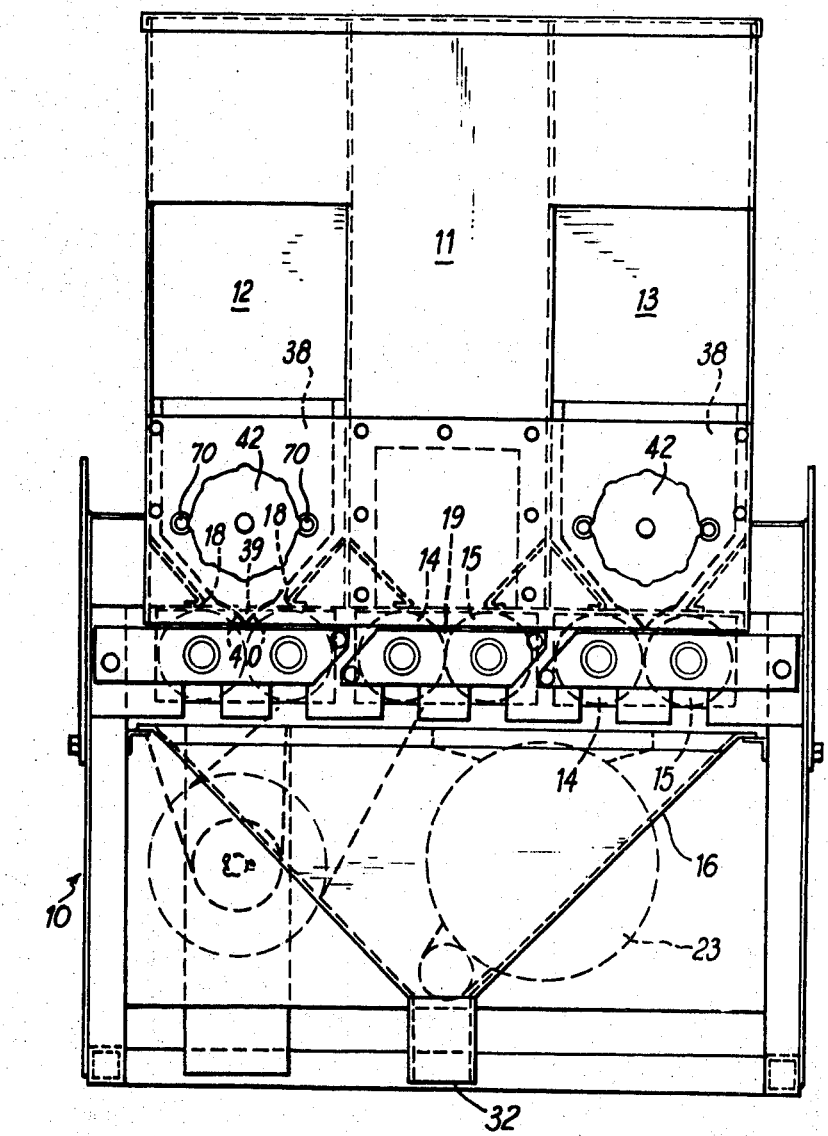
FIG. 2 is a front elevation of the apparatus of FIG. 1.
Figure 3:
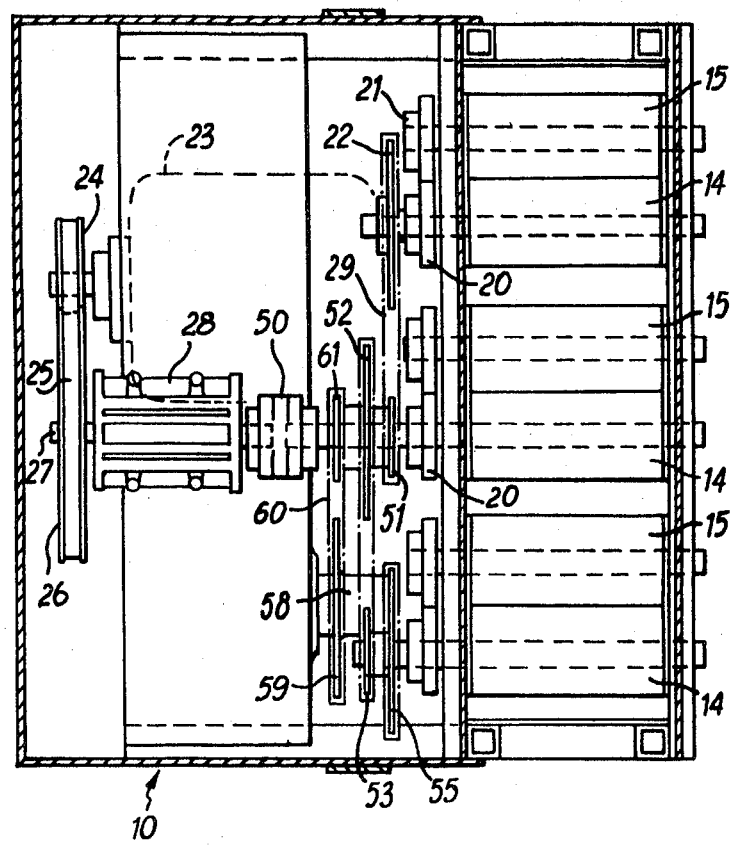
FIG. 3 is a section on the line A—A of FIG. 1.
Figure 4:
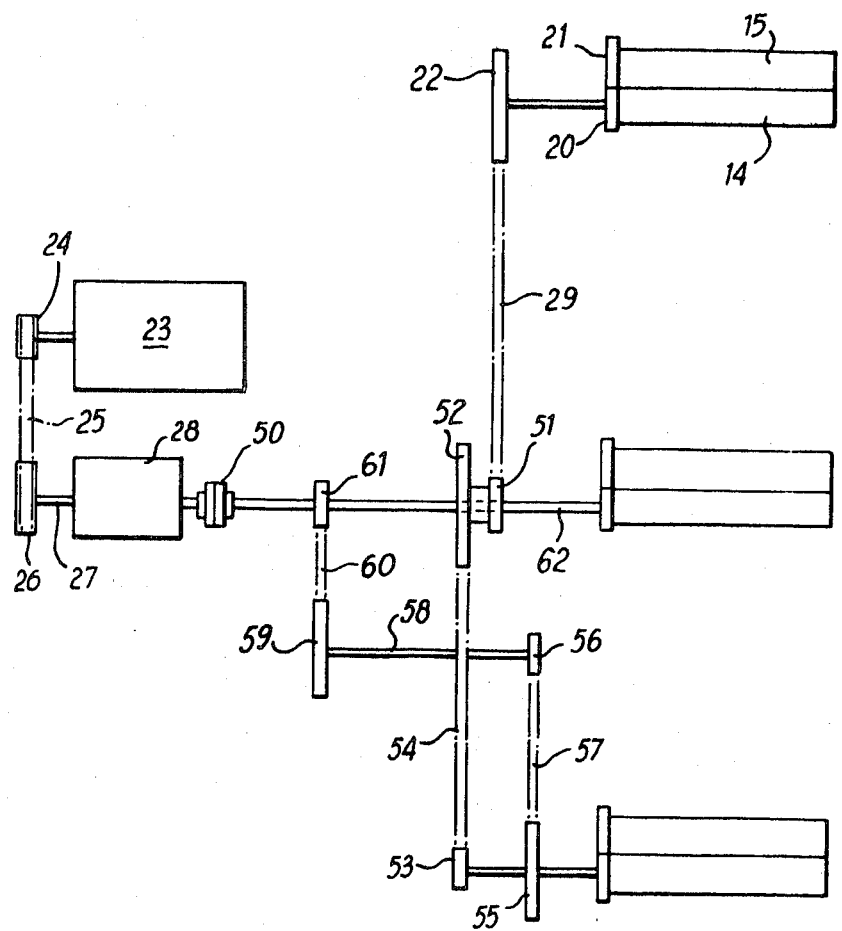
FIG. 4 is a schematic layout of the drive arrangement for the apparatus.

The apparatus may be used for mixing and dispensing particulate materials, such as grains, seeds, granules, fragments, short lengths and the like. Particular uses are mentioned in U.S. Pat. application Ser. No. 855,843, filed Sept. 8, 1969, to which reference is hereby made.

The apparatus illustrated in the drawings comprises a framework 10, a main feed hopper 11 and two auxiliary feed hoppers 12 and 13, metering means 14, 15 associated with each feed hopper, and a main collection hopper 16.

The framework 10 is constructed of suitable angle iron or the like and may be supported on castors (not shown) to make the apparatus readily mobile. Each feed hopper has a removable lid 17 and an elongated aperture 18 in its lower face. Beneath each aperture 18 is a metering means in the form of two cylindrical rollers 14, 15 each comprising a central spindle with a neoprene sleeve fixed thereto.

The rollers 14, 15 are mounted on parallel horizontal axes for rotation in suitable bearings at each end, and each pair together form a feed nip 19 adjacent to the outlet aperture 18 of the associated feed hopper.

At one one the rollers 14, 15 carry respectively gear wheels 20, 21, the wheels 20, 21 of each pair being in mesh, and at the same end of roller 14 of hopper 13 is a chain wheel 22. An electric motor 23 has a pulley 24 mounted on its output shaft and this drives through a belt 25 another pulley 26 mounted on a shaft 27 associated with a reduction gearing 28 which is connected to the spindle of one of the rollers 14, 15 associated with the main feed hopper 11 via a coupling 50.

Two axially spaced chain sprocket wheels 51, 52 can freely rotate together on the spindle 62 of the roller 14 of the main hopper 11 and a chain 29 connects the wheel 51 with the wheel 22 of hopper 13.

The spindle of roller 14 of hopper 12 carries a chain wheel 53 connected by chain 54 with wheel 52. This spindle also carries a chain wheel 55 which connects with a chain wheel 56 through a chain 57. The wheel 56 is mounted on a countershaft 58 as is a wheel 59. The wheel 59 is connected via a chain 60 with a chain wheel 61 which rotates with the spindle 62. Rotation of spindle 62 thus rotates the rollers 14, 15 of hopper 11 directly, the rollers 14, 15 of hopper 12 through chains 60 and 57, and the rollers 14, 15 of hopper 13 through chains 60, 57, 54 and 29.

The rollers 14, 15 of each pair rotate in opposite directions.

The material passing through the three pairs of metering rollers, 14, 15 is collected in the common collecting hopper 16 having a lower outlet 32.

Means are provided whereby the percentage of the total material delivered by the auxiliary hoppers can be varied. Each auxiliary hopper has an inclined wall 33 dividing the hopper into chambers 34 and 35, communication between surfaces chambers being through the gap 36 between the wall 33 and the rear wall 37 of the hopper. The particulate material passes from the chamber 34 through the gap 36 into the chamber 35 and to the nip between the rollers 14, 15. The length of the nip exposed to the material can be varied to vary the metering capacity of the rollers by means of an adjustable shutter 38. The shutter 38 has an apex 39 extending into the nip and is curved at 40 so as to be spaced in the nip a uniform distance from the surface of the rollers.

The shutter 38 has two apertures through which extend fixed circular guide rods 70. The shutter can slide on the guide rods which extend the full length of the hopper. With this arrangement the shutter does not rotate and damage the neoprene rollers 14, 15 as it is adjusted axially on the guide rods.

A shaft 40a extends through the hopper wall and carries an operating knob or handle 42 provided with a scolloped periphery to aid manual rotation.

The shaft 40a is externally threaded and at its inner end is reduced in diameter to pass through a drilled hole in the shutter, which is retained on the shaft by a washer and split pin. A nut 71 is welded to the exterior of the hopper body and the shaft 40a extends through the nut so that as the knob 42 is rotated the shutter moves across the chamber 35 to increase or decrease the nip exposed to the material and hence the metering capacity.

For example for given sizes of the chain wheels 22 the percentage of the total material which is fed from the auxiliary hopper 12 may be varied between say 5 and 25 percent and that from the auxiliary hopper 13 between 1 and 5 percent. The auxiliary hoppers may have a capacity of 0.55 cubic feet, the main hopper 11 0.65 cubic feet, and the main hopper 11 may have a maximum delivery of 560 pounds per hour.

Various modifications can be made. For example there could be only one, or more than two, auxiliary feed hoppers, enabling two or more different materials to be mixed. There may be provided in the collecting hopper an agitating device to ensure thorough mixing; controls may be incorporated for rendering the drive to one or more of the metering means inoperative where, for example, "starve feeding" is required, and provision may be made for changing chain wheels to give different ranges of feeds from the three hoppers.

In use the collection hopper, which is removably supported, may be removed and replaced by three collection boxes, one beneath each of the feed hoppers 11, 12, 13. These boxes are used for calibration purposes. Thus it will be known from previous experience how to position the shutters 38 for a given type of material so that a given percentage is delivered from the auxiliary feed hoppers. The knobs are set accordingly and after a short period the collection boxes are removed and the proportions of the three materials measured. If these are not sufficiently close to the desired proportions then appropriate further adjustment of the shutters will be made, until a sufficiently accurate percentage is obtained. The main collection hopper is then replaced and the apparatus is ready for use.

We claim:

1. Apparatus for mixing and dispensing at least two different particulate materials in accurately controlled proportions comprising
   a. at least two hoppers.
   b. metering means associated with each hopper outlet consisting of a pair of rollers disposed to form a nip through which material reaching the upper side thereof is dispensed at a rate depending upon the speeds and directions of rotation of the rollers, their surface characteristics and their relative dispositions and sizes
   c. means for adjusting the metering capacity of at least one of said metering means consisting of a vertical shutter plate supported within the lower part of the hopper at right angles to the axes of said rollers and in close-fitting relationship with the walls of the container and the rollers, means for shifting said plate axially of said rollers, and a downwardly and inwardly inclined guide member within the hopper, so disposed as to separate said shutter plate over its entire operating range, from the upper part of the hopper except for an aperture affording access to one side of said shutter plate in a region below its upper edge, and
   d. a further hopper disposed beneath said first mentioned hoppers to receive all the particulate material issuing from said metering means and dispense it to a desired location.

2. Apparatus as set forth in claim 1 in which said aperture is defined by the lower edge of said guide member and the wall of the hopper, that part of said wall lying opposite said guide member being also downwardly and inwardly inclined.

3. Apparatus as set forth in claim 2 further comprising power drive means for said metering means, and variable-type transmission means between said power drive means and said metering means.

* * * * *